(12) United States Patent
Siddiqui et al.

(10) Patent No.: US 12,380,098 B2
(45) Date of Patent: Aug. 5, 2025

(54) CACHE-EFFICIENT TOP-K AGGREGATION OVER HIGH CARDINALITY LARGE DATASETS

(71) Applicant: Microsoft Technology Licensing, LLC, Redmond, WA (US)

(72) Inventors: Tarique Ashraf Siddiqui, Redmond, WA (US); Vivek Ravindranath Narasayya, Redmond, WA (US); Marius Dumitru, Issaquah, WA (US); Surajit Chaudhuri, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 75 days.

(21) Appl. No.: 18/474,399

(22) Filed: Sep. 26, 2023

(65) Prior Publication Data

US 2025/0103591 A1    Mar. 27, 2025

(51) Int. Cl.
*G06F 16/24* (2019.01)
*G06F 16/242* (2019.01)
*G06F 16/2455* (2019.01)

(52) U.S. Cl.
CPC ...... *G06F 16/244* (2019.01); *G06F 16/24552* (2019.01); *G06F 16/24554* (2019.01)

(58) Field of Classification Search
CPC ............. G06F 16/24554; G06F 16/244; G06F 16/24552
See application file for complete search history.

(56) References Cited

U.S. PATENT DOCUMENTS

| | | | |
|---|---|---|---|
| 6,571,244 B1* | 5/2003 | Larson | G06F 16/9027 707/753 |
| 2021/0200610 A1* | 7/2021 | Chu | H04L 9/40 |
| 2021/0209111 A1* | 7/2021 | Chung | G06F 16/24554 |
| 2024/0126760 A1* | 4/2024 | Lui | G06F 16/24542 |

OTHER PUBLICATIONS

Siddiqui, Tarique, et al. "Cache-Efficient Top-k Aggregation over High Cardinality Large Datasets." Proceedings of the VLDB Endowment 17.4 (2023): 644-656. (Year: 2023).*

(Continued)

*Primary Examiner* — Mohsen Almani
(74) *Attorney, Agent, or Firm* — NovoTechIP International PLLC

(57) ABSTRACT

A data processing system implements a cache-conscious aggregation framework for cache-efficient top-k aggregation over high cardinality large datasets. The framework leverages skew in the distribution of data in the datasets to minimize data movements within the local caches of the cores of the multicore processors of the data processing system. The framework performs representative sampling on the dataset and utilizes these samples to identify candidate groups in the dataset for the top-k results. The system performs exact aggregations for the candidate groups and performs hashing and pruning on the non-candidate groups in the dataset to identify top-k results included in the non-candidate groups without having to calculate the exact aggregations for the non-candidate groups.

20 Claims, 10 Drawing Sheets

(56) References Cited

OTHER PUBLICATIONS

Mamoulis, Nikos, et al. "Efficient top-k aggregation of ranked inputs." ACM Transactions on Database Systems (TODS) 32.3 (2007): 19-es. (Year: 2007).*

Heres belog,https://xebia.com/blog/optimizing-topk-queries-in-datafusion/?utm_source=GDD&utm_medium=redirect&utm_campaign=consolidation&utm_content=xebia.com-blog-optimizing-topk-queries-in-datafusion—(Year: 2022).*

Ramakrishnan, Smriti R., Garret Swart, and Aleksey Urmanov. "Balancing reducer skew in MapReduce workloads using progressive sampling." Proceedings of the Third ACM symposium on cloud computing. 2012. (Year: 2012).*

Rauhe, Hannes, et al. "Multi-level parallel query execution framework for cpu and gpu." Advances in Databases and Information Systems: 17th East European Conference, ADBIS 2013, Genoa, Italy, Sep. 1-4, 2013. Proceedings 17. Springer Berlin Heidelberg, 2013. (Year: 2013).*

Zhang, Qing, et al. "Aggregate query answering on anonymized tables." 2007 IEEE 23rd international conference on data engineering. IEEE, Jan. 2006. (Year: 2006).*

Müller, Ingo. Engineering Aggregation Operators for Relational In-Memory Database Systems. Diss. Dissertation, Karlsruhe, Karlsruher Institut für Technologie (KIT), 2016, 2016. (Year: 2016).*

Albutiu, et al., "Massively Parallel Sort-Merge Joins in Main Memory Multi-Core Database Systems", In Repository of arXiv:1207.0145v1, Jun. 30, 2012, pp. 1064-1075.

Balkesen, et al., "MultiCore, MainMemory Joins: Sort vs. Hash Revisited", In Proceedings of the VLDB Endowment, vol. 7, Issue 1, Sep. 1, 2013, pp. 85-96.

Barber, et al., "Memory-Efficient Hash Joins", In Proceedings of the VLDB Endowment, vol. 8, Issue 4, Dec. 1, 2014, pp. 353-364.

Boncz, et al., "MonetDB/X100: Hyper-Pipelining Query Execution", In Proceedings of Second Biennial Conference on Innovative Data Systems Research, Jan. 4, 2005, 13 Pages.

Chandramouli, et al., "Patience is a Virtue: Revisiting Merge and Sort on Modern Processors", In Proceedings of ACM SIGMOD International Conference on Management of Data, Jun. 22, 2014, pp. 731-742.

Chronis, et al., "External Merge Sort for Top-K Queries: Eager Input Filtering Guided by Histograms", In Proceedings of ACM SIGMOD International Conference on Management of Data, Jun. 14, 2020, pp. 2423-2437.

Cieslewicz, et al., "Adaptive Aggregation on Chip Multiprocessors", In Proceedings of the 33rd International Conference on Very Large Data Bases, Sep. 23, 2007, pp. 339-350.

Dewitt, et al., "Implementation Techniques for Main Memory Database Systems", In Proceedings of ACM SIGMOD International Conference on Management of Data, Jun. 18, 1984, 8 Pages.

Flajolet, et al., "Probabilistic Counting Algorithms for Data Base Applications", In Journal of Computer and System Sciences, vol. 31, Issue 2, Oct. 1, 1985, pp. 182-209.

Gray, et al., "Quickly Generating Billion-Record Synthetic Databases", In Proceedings of ACM SIGMOD International Conference on Management of Data, May 24, 1994, pp. 243-252.

Hellerstein, et al., "Online Aggregation", In Proceedings of ACM SIGMOD International Conference on Management of Data, May 13, 1997, pp. 171-182.

Heres, Daniel, "Optimizing TopK queries in DataFusion", Retrieved from: https://godatadriven.com/blog/optimizing-topk-queries-in-datafusion/, Sep. 28, 2022, 5 Pages.

Ilyas, et al., "A Survey of Top-k Query Processing Techniques in Relational Database Systems", In Journal of ACM Computing Surveys, vol. 40, Issue 4, Oct. 1, 2008, 58 Pages.

Karp, et al., "A Simple Algorithm for Finding Frequent Elements in Streams and Bags", In Journal of ACM Transactions on Database Systems, vol. 28, Issue 1, Mar. 1, 2003, pp. 51-55.

Kim, et al., "Rapid Sampling for Visualizations with Ordering Guarantees", In Proceedings of the VLDB Endowment, vol. 8, Issue 5, Jan. 2015, pp. 521-532.

Kim, et al., "Sort vs. Hash Revisited: Fast Join Implementation on Modern Multi-Core CPUs", In Proceedings of the VLDB Endowment, vol. 2, Issue 2, Aug. 24, 2009, pp. 1378-1389.

Li, et al., "Supporting Ad-hoc Ranking Aggregates", In Proceedings of ACM SIGMOD International Conference on Management of Data, Jun. 27, 2006, pp. 61-72.

Manegold, et al., "Optimizing Main-Memory Join on Modern Hardware", In Journal of IEEE Transactions on Knowledge and Data Engineering, vol. 14, Issue 4, Jul. 2002, pp. 709-730.

Manku, et al., "Approximate Frequency Counts over Data Streams", In Proceedings of 28th International Conference on Very Large Databases, Aug. 20, 2002, 12 Pages.

Metwally, et al., "An Integrated Efficient Solution for Computing Frequent and Top-k Elements in Data Streams", In Journal of ACM Transactions on Database Systems, vol. 31, Issue 3, Sep. 1, 2006, pp. 1095-1133.

Muller, et al., "Cache-Efficient Aggregation: Hashing is Sorting", In Proceedings of ACM SIGMOD International Conference on Management of Data, May 31, 2015, pp. 1123-1136.

Newman, Marke. , "Power laws, Pareto Distributions and Zipf's Law", In Journal of Contemporary Physics, vol. 46, Issue 5, Sep. 2005, pp. 323-351.

Polychroniou, et al., "A Comprehensive Study of Main-Memory Partitioning and its Application to Large-Scale Comparison- and Radix-Sort", In Proceedings of ACM SIGMOD international conference on Management of data, Jun. 22, 2014, pp. 755-766.

Polychroniou, et al., "High Throughput Heavy Hitter Aggregation for Modern SIMD Processors", In Proceedings of the Ninth International Workshop on Data Management on New Hardware, Jun. 24, 2013, 6 Pages.

Raman, et al., "DB2 with BLU Acceleration: So Much More than Just a Column Store", In Proceedings of VLDB Endowment, vol. 6, Issue 11, Aug. 1, 2013, pp. 1080-1091.

Roy, et al., "Efficient Frequent Item Counting in Multi-Core Hardware", In Proceedings of 18th ACM SIGKDD International Conference on Knowledge Discovery and Data Mining, Aug. 12, 2012, pp. 1451-1459.

Shanbhag, et al., "Efficient Top-K Query Processing on Massively Parallel Hardware", In Proceedings of International Conference on Management of Data, Jun. 10, 2018, pp. 1557-1570.

Shatdal, et al., "Adaptive Parallel Aggregation Algorithms", In Journal of ACM SIGMOD Record, vol. 24, Issue 2, May 22, 1995, pp. 104-114.

Wassenberg, et al., "Engineering a Multi-core Radix Sort", In Proceedings of 17th International Conference on Euro-Par, Aug. 29, 2011, pp. 160-169.

Ye, et al., "Scalable Aggregation on Multicore Processors", In Proceedings of the Seventh International Workshop on Data Management on New Hardware, Jun. 13, 2011, 9 Pages.

* cited by examiner

```
SELECT X, AGG (Y) AS A
FROM R
GROUP BY X
ORDER BY A
LIMIT k
```

FIG. 3A

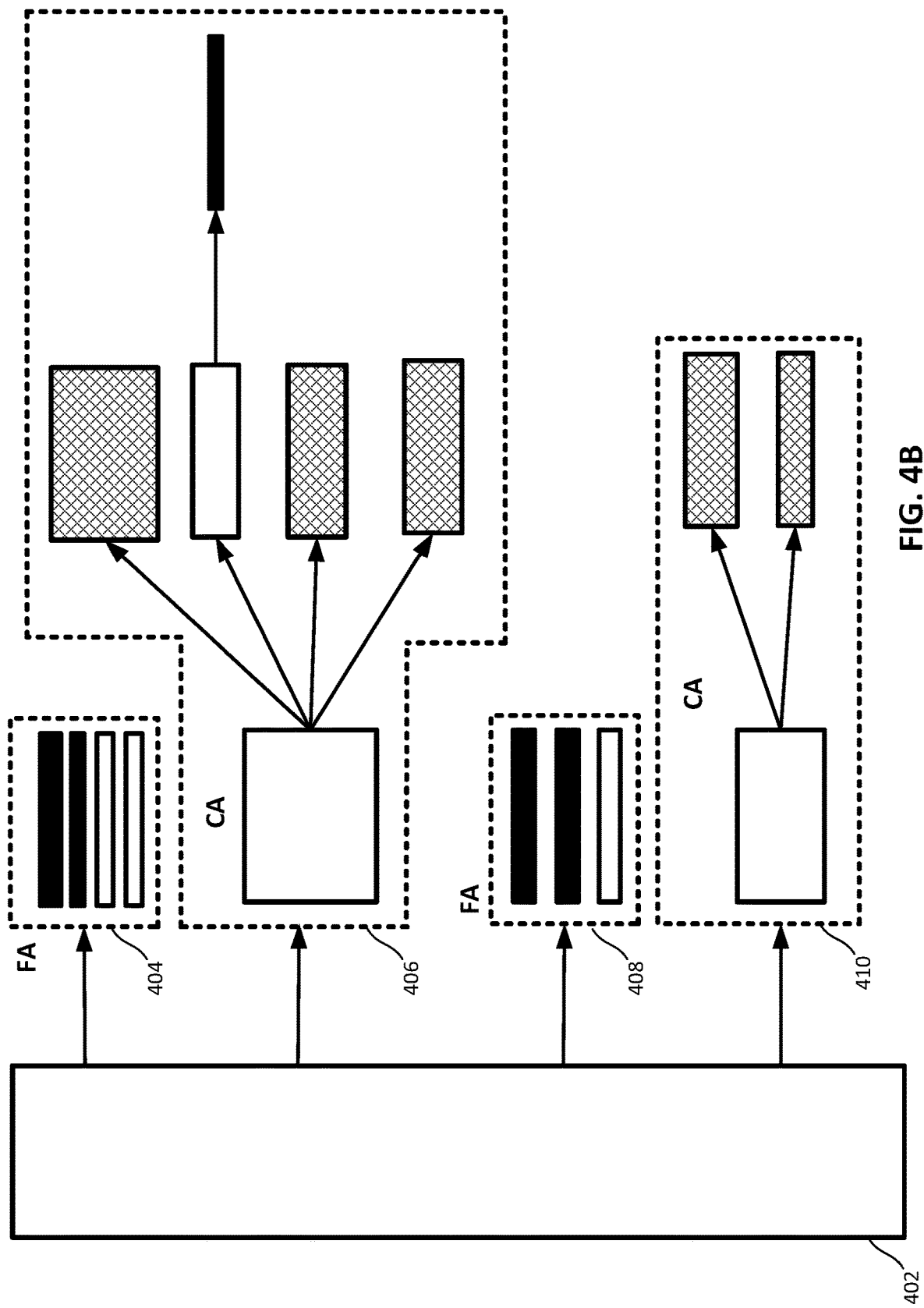

CACHE-EFFICIENT TOP-K AGGREGATION OVER HIGH CARDINALITY LARGE DATASETS

BACKGROUND

Top-k aggregation queries are widely used in data analytics for summarizing and identifying important groups from large amounts of data. These queries are usually processed by first computing exact aggregates for all groups and then selecting the groups with the top-k aggregate values. However, such an approach can be inefficient for high-cardinality large datasets where intermediate results may not fit within the local cache of multicore processors, leading to excessive data movement. Hence, there is a need for improved systems and methods that provide a for more efficient top-k aggregation mechanism for high cardinality large data sets.

SUMMARY

An example data processing system according to the disclosure includes a processor and a machine-readable medium storing executable instructions. The instructions when executed cause the processor alone or in combination with other processors to perform operations including receiving a query to perform a top-k aggregation query on a dataset comprising a plurality of tuples to obtain top-k results, the top-k results comprising an aggregated measure value Y and a grouping key X, the grouping key X determining whether a respective tuple of the plurality of tuples is included in a particular group of tuples, and k representing a limit on a number of results included in the top-k results; sampling a representative subset of the dataset to generate a set of samples; analyzing the set of samples to determine candidate groups and non-candidate groups, the candidate groups being predicted to be included in the top-k results, and the non-candidate groups being predicted to not be included in the top-k results; creating a first cache resident data structure for storing the candidate groups and a second cache resident data structure for storing the non-candidate groups in the cache of each core of the multicore processor; storing the candidate groups in the first cache resident data structure and the non-candidate groups in the second cache resident data structure; determining exact aggregate values for the candidate groups in the first cache resident data structure for each core of the multicore processor; partitioning the non-candidate groups in the second cache resident data structure of each core of multicore processor into a plurality of partitions; determining statistics for each partition of the plurality of partitions for each core of the multicore processor by aggregating values associated with tuples associated with each partition; merging the exact aggregate values for the candidate groups for the plurality of cores to generate merged exact aggregate values for the candidate groups; merging the statistics for the plurality of partitions of each core of the multicore processor to create merged statistics for partitions including the non-candidate groups; pruning at least a portion of the plurality of partitions based on the merged statistics; reranking unpruned partitions from the plurality of partitions; and determining the top-k results from among the candidate groups and the reranked unpruned partitions.

An example method implemented in a data processing system includes receiving a query to perform a top-k aggregation query on a dataset comprising a plurality of tuples to obtain top-k results, the top-k results comprising an aggregated measure value Y and a grouping key X, the grouping key X determining whether a respective tuple of the plurality of tuples is included in a particular group of tuples, and k representing a limit on a number of results included in the top-k results; sampling a representative subset of the dataset to generate a set of samples; analyzing the set of samples to determine candidate groups and non-candidate groups, the candidate groups being predicted to be included in the top-k results, and the non-candidate groups being predicted to not be included in the top-k results; creating a first cache resident data structure for storing the candidate groups and a second cache resident data structure for storing the non-candidate groups in the cache of each core of the multicore processor; storing the candidate groups in the first cache resident data structure and the non-candidate groups in the second cache resident data structure; determining exact aggregate values for the candidate groups in the first cache resident data structure for each core of the multicore processor; partitioning the non-candidate groups in the second cache resident data structure of each core of multicore processor into a plurality of partitions; determining statistics for each partition of the plurality of partitions for each core of the multicore processor by aggregating values associated with tuples associated with each partition; merging the exact aggregate values for the candidate groups for the plurality of cores to generate merged exact aggregate values for the candidate groups; merging the statistics for the plurality of partitions of each core of the multicore processor to create merged statistics for partitions including the non-candidate groups; pruning at least a portion of the plurality of partitions based on the merged statistics; reranking unpruned partitions from the plurality of partitions; and determining the top-k results from among the candidate groups and the reranked unpruned partitions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 3A is a diagram showing an example top-k aggregation query.

FIG. 4B is a diagram showing an example of aggregation according to the cache-conscious aggregation framework described herein.

DETAILED DESCRIPTION

Figure 1:
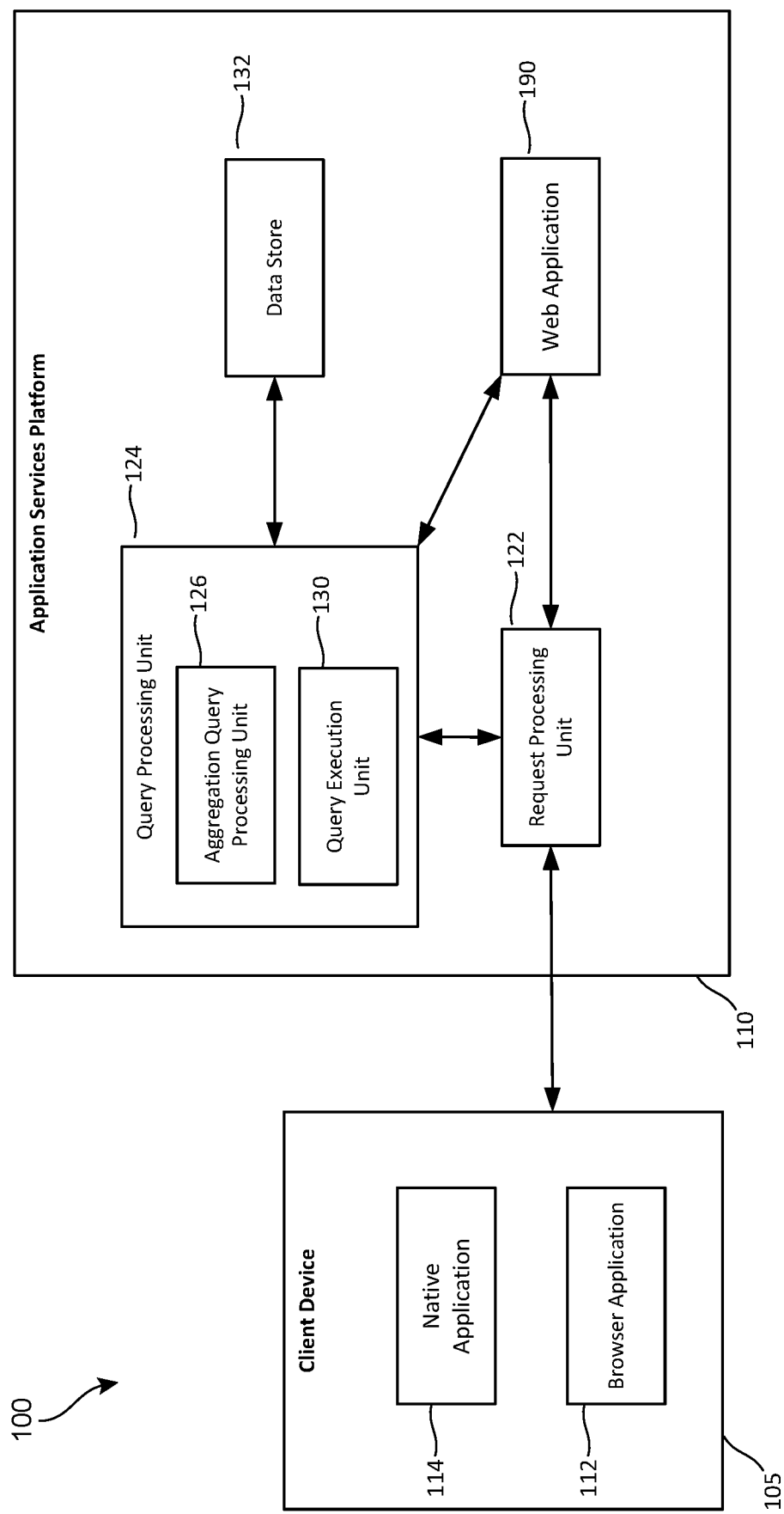
FIG. 1 is a diagram of an example computing environment in which the techniques for cache-efficient top-k aggregation over high cardinality large datasets described herein are implemented.

Systems and methods for cache-efficient top-k aggregation over high cardinality large datasets are described herein. These techniques provide a technical solution to the technical problem of efficiently determining the results of top-k aggregation queries. Top-k aggregation queries are often used to aggregate data in large multicore databases that utilize multiple processor cores to facilitate parallel processing to generate the top-k aggregation results. Such aggregation queries are commonly used in business intelligence (BI) analytics tools, and many BI application dashboards and/or reports generated by these applications often include one or more top-k aggregation results. The standard approach for determining the results of such top-k aggregation theories is to first determine the exact aggregates for all groups of data in the dataset and then select the groups having the top-k aggregate values from among all of the groups. This approach to aggregation can be reasonably fast when the number of groups in the dataset is relatively small. However, once the cardinality of the groups exceeds the capacity of the local cache of the processor, including both the level one cache (L1) and level two cache (L2), performance of the standard approach degrades significantly due to a considerable amount of data movement resulting from cache-line transfers between the local cache and level three cache (L3) and/or main memory. Some attempts have been made to implement cache-conscious aggregation algorithms to minimize data movement in multicore environments. However, such algorithms are not optimized for top-k aggregation and computing the exact aggregates for every grouping key still consumes a substantial amount of the processing resources utilized for computing the top-k aggregation for high cardinality large datasets.

The techniques herein provide a technical solution to the technical problem of efficiently determining the results of top-k aggregation queries without fully aggregating all groups in the dataset. A technical benefit of this is approach is that the amount of computing resources required to determine the results of a top-k aggregation query is significantly reduced compared to the standard approach and current cache-conscious approaches. The techniques herein provide a new cache-conscious aggregation framework that efficiently identifies top-k aggregates. The cache-conscious aggregation framework primarily focuses on monotonic aggregation functions, such as but not limited to sum, count, min, and max, which are commonly utilized in business intelligence applications to summarize large datasets. Such monotonic functions exhibit the property that the aggregate values for a given group either increases or decreases as additional tuples belonging to the group are aggregated. The cache-conscious aggregation framework implements an adaptive multi-pass strategy in which the data is partitioned and repartitioned. However, the cache-conscious aggregation framework provided herein can also benefit non-monotonic functions, such as but not limited to the average function (AVG), by bounding these functions using monotonic functions, particularly for highly skewed distributions. A technical benefit of this adaptive multi-pass approach is reduced cache line transfers compared to approaches that make only one or two passes through the data.

Another technical benefit of the adaptive multi-pass approach taken by the cache-conscious aggregation framework is reducing computing resources by adopting a strategy of early partition pruning to remove partitions that are less likely to include the top-k results. Identifying which partitions to prune early is a challenging technical problem. The cache-conscious aggregation framework uses a sampling strategy to sample a representative subset of the data to be analyzed to select a set of promising groups referred to herein as candidate groups. A technical benefit of the sampling approach is that the cost in computing resources to implement the sampling is negligible compared with the cost in computing resources to analyzing the full dataset. The samples are also utilized to determine whether the data distribution of the dataset exhibits sufficient skewness suitable for top-k optimization. A benefit of this approach is that a determination can be made early in the process whether the dataset exhibits sufficient skewness for the cache-conscious aggregation framework to perform more efficiently than the standard approach.

Once the initial candidate groups have been identified, the cache-conscious aggregation framework focuses on optimizing the adaptive multi-pass aggregation by simultaneously pruning irrelevant partitions and computing exact aggregation values efficiently. The cache-conscious aggregation framework leverages two cache resident data structures to achieve this optimization. The first cache resident data structure is a fine-grained aggregates (FA) data structure that uses optimized hash tables to store candidate groups likely to be in the top-k. A technical benefit of this approach is that it enables efficient and early computation of exact aggregates for these groups. The second cache resident data structure is a coarse-grained aggregates (CA) data structure that is used for partitioning the data corresponding to non-candidate groups that are determined to be less likely to be in the top-k. The second cache resident data structure computes course-grained statistics for the groups less likely to be in the top-k and uses a software write-combining (WC) technique to efficiently partition and evict these groups to the main memory, when the cache is full. After each pass on the dataset, the cache-conscious aggregation framework analyzes the intermediate results to compute bounds and to prune partitions that are guaranteed to not contain the top-k groups. A technical benefit of pruning these partitions is that subsequent passes of the adaptive multi-pass aggregation are significantly faster and require fewer computing resources. The cache-conscious aggregation framework also utilizes logical partitioning rather than physical partitioning of the dataset and instead utilizes the hash for each grouping key. Statistics for each of the grouping keys are maintained, which allows the cache-conscious aggregation framework to compute bounds on aggregates for groups belonging to the same partition for pruning. Consequently, the cache-conscious aggregation framework can prune groups from the dataset without the need for physical partitioning of the dataset. These and other technical benefits of the techniques disclosed herein will be evident from the discussion of the example implementations that follow.

The term high cardinality large dataset, as used herein can be represented as follows. Let N be the size of a table, M be the number of unique groups, and C be the number of groups (both keys and aggregates) that can be accommodated in the local cache (both L1 and L2). The techniques herein are intended for use with a large input dataset that has high cardinality, such as that N>>M>>C. Furthermore, real world datasets typically have skew in grouping columns as well as skew in aggregate column values. As will be discussed in greater detail in the example implementations which follow, in scenarios of low skew in the dataset or a large k (the limit on the number of groups), the framework provided herein automatically falls back to the standard full aggregation to minimize overhead. Finally, the examples discussed herein assume that the value of k is significantly smaller than the unique groups included in the dataset (i.e., the unique values of X as discussed below).

Multi-core aggregations can be broadly classified into two classes: few-pass algorithms and multi-pass algorithms. Few-pass algorithms make a fixed number of passes on the input dataset. Multi-pass algorithms recursively partition the dataset (with local aggregation whenever possible) until the partition fits into the local cache. Several few-pass algorithms have been developed, including ATOMIC, INDEPENDENT, HYBRID, and PLAT.

The ATOMIC approach employs a shared hash table protected by atomic instructions, with all cores of the multicore processor working together. However, this approach can encounter contention issues due to concurrent updates, particularly when the shared hash table size exceeds the cache capacity.

The INDEPENDENT approach shares an aggregation data structure among multiple cores. This approach is effective when there is uneven distribution (skew) in the frequency of groups because contention for popular data items can cause significant delays and hinder parallel execution. A solution to this problem is to maintain a private running aggregate on each core to eliminate coordination overhead. These partial aggregates are then combined at the end of the process. In the first pass, each thread creates a hash table based on that thread's portion of the input dataset. In the second phase, the hash tables are merged. However, this approach incurs substantial data movement overhead when the private hash table sizes exceeds the hash capacity.

The HYBRID approach involves each thread aggregating that thread's part of the input dataset into a private hash table sized according to the thread's portion of the shared L3 cache. Once the hash table reaches capacity, older entries are evicted in a manner similar to a least recently used (LRU) cache. Like the INDEPENDENT approach, this approach become less efficient when a significant portion of the output cannot fit into private hash tables.

The PLAT approach performs aggregation in private hash tables whenever possible and overflows additional data to partitions for later merging. However, even with data moved to partitions, the number of groups may still be extensive and may not fit in the local cache during the second pass.

Each of the approaches described above faces a similar significant limitation. Each of these methods has a fixed number of passes, which leads to high data movements over large datasets with a high cardinality of groups. Consequently, new approaches have been developed to address the shortcomings of the fixed-pass approach. These approaches include multi-pass multi-core aggregation and top-k pushdown in parallel aggregation.

Figure 4A:
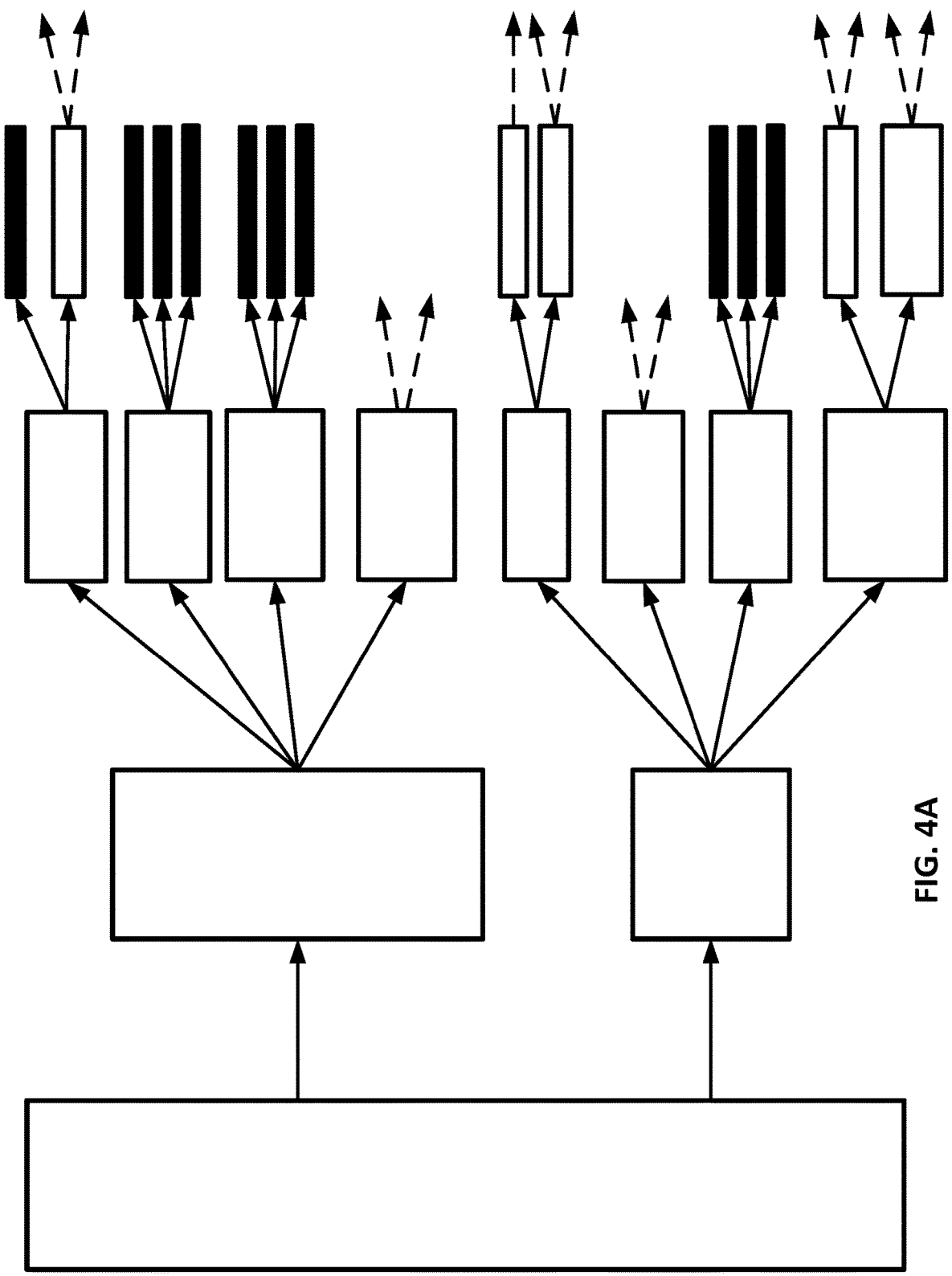
FIG. 4A is a diagram showing an example of multi-pass aggregation.

The multi-pass multi-core aggregation approach was suggested by Müller, et al. in "Cache-efficient aggregation: Hashing is sorting" in Proceedings of the 2015 ACM SIGMOD International Conference on Management of Data. The multi-pass multi-core aggregation approach is targeted towards high-cardinality large datasets settings where the input dataset is recursively partitioned until the partition fits into the local cache. Once the partition fits into the local cache, hashing or sorting based aggregation is performed. FIG. 4A shows an example of this approach. The boxes shaded in black depict the aggregated tuples in this example. The multi-pass multi-core aggregation approach shows that hash-based and sort-based aggregations are equivalent in terms of the number of cache-line transfers that they incur. This is because the partitioning dominates the overall cost in both hash-based and sort-based aggregations for high cardinality large datasets. The multi-pass multi-core aggregation approach tends to outperform the few-pass approaches discussed above. However, this approach is not designed to support top-k optimizations. The techniques provided herein build upon the multi-pass multi-core aggregation approach to provide cache-efficient top-k aggregation.

FIG. 1 is a diagram of an example computing environment 100 in which the techniques herein may be implemented. The example computing environment 100 includes a client device 105 and an application services platform 110. The application services platform 110 provides one or more cloud-based applications and/or provides services to support one or more web-enabled native applications on the client device 105. These applications may include but are not limited to business intelligence tools for querying and analyzing large amounts of data to generate reports, visualizations, and/or other type of content from based on the large datasets. The datasets may be stored in one or more datastores implemented on the application services platform 110, such as the datastore 132. The application services platform 110 supports various types of queries, including top-k aggregation queries. The application services platform 110 implements the cache-conscious aggregation framework for cache-efficient top-k aggregation over high cardinality large datasets described herein. Details of how the cache-conscious aggregation framework is implemented are described in greater detail in the examples which follow. The client device 105 and the application services platform 110 communicate with each other over a network (not shown). The network may be a combination of one or more public and/or private networks and may be implemented at least in part by the Internet.

The application services platform 110 includes a request processing unit 122, a query processing unit 124, a web application 190, and a datastore 132. The request processing unit 122 is configured to receive requests from the native application 114 of the client device 105 and/or the web application 190 of the application services platform 110. The requests may include but are not limited to requests to create, view, and/or modify various types of electronic content, including authoring queries, executing queries on the datastore, and/or creating reports, visualizations, and/or other types of content based on results of the queries. The request processing unit 122 also coordinates communication and exchange of data among components of the application services platform 110 as discussed in the examples which follow.

The query processing 124 includes an aggregation query processing unit 126 and a query execution unit 130. The query processing unit 124 receives queries from the native application 114 and/or the web application 190 and executes the queries on the data source 132. The data source 132 is a persistent datastore for storing various types of data. In some implementations, the data source 132 is implemented by a relational database system that supports various types of queries, including aggregation queries. The aggregation query processing unit 126 implements the techniques for cache-efficient top-k aggregation over high cardinality large datasets described herein. Additional details of the aggregation query processing unit 126 are discussed with respect to the example implementation shown in FIG. 2. The query execution unit 130 executes queries on the datastore 132. The query is authored in a structured language, such as but not limited to Structured Query Language (SQL). An example of a SQL aggregation query is shown in FIG. 3A, which is described in detail below.

The client device 105 is a computing device that may be implemented as a portable electronic device, such as a mobile phone, a tablet computer, a laptop computer, a portable digital assistant device, a portable game console, and/or other such devices in some implementations. The client device 105 may also be implemented in computing devices having other form factors, such as a desktop computer, vehicle onboard computing system, a kiosk, a point-of-sale system, a video game console, and/or other types of computing devices in other implementations. While the example implementation illustrated in FIG. 1 includes a single client device 105, other implementations may include a different number of client devices that utilize services provided by the application services platform 110.

The client device 105 includes a native application 114 and a browser application 112. The native application 114 is a web-enabled native application, in some implementations, that enables users to view, create, and/or modify electronic content. The native application 114 enables the user to author and/or access queries to be executed by the query processing unit 124. The web-enabled native application also enables the user to author and/or access queries to be executed by the query processing unit 124. The native application 114 implements the user interface that enables users to interact with the application in some implementations. In other implementations, the browser application 112 is used for accessing and viewing web-based content provided by the application services platform 110. In such implementations, the application services platform 110 implements one or more web applications, such as the web application 190, that enables users to view, create, and/or modify electronic content and to obtain template recommendations for creating and/or modifying the electronic content. The web-enabled native application also enables the user to author and/or access queries to be executed by the query processing unit 124. The web application implements the user interface that enables users to interact with the application in some implementations. The application services platform 110 supports both the native application 114 and a web application 190 in some implementations, and the users may choose which approach best suits their needs.

The request processing unit 122 is configured to receive requests from the native application 114 of the client device 105 and/or the web application 190 of the application services platform 110. The requests may include but are not limited to requests to create, view, and/or modify various types of electronic content and/or sending queries to be executed to the query processing unit 124. The request processing unit 122 also provides query request to the native application 114 and/or the web application 190 in response to a query. The request processing unit 122 also coordinates communication and exchange of data among components of the application services platform 110 as discussed in the examples which follow.

Figure 2:
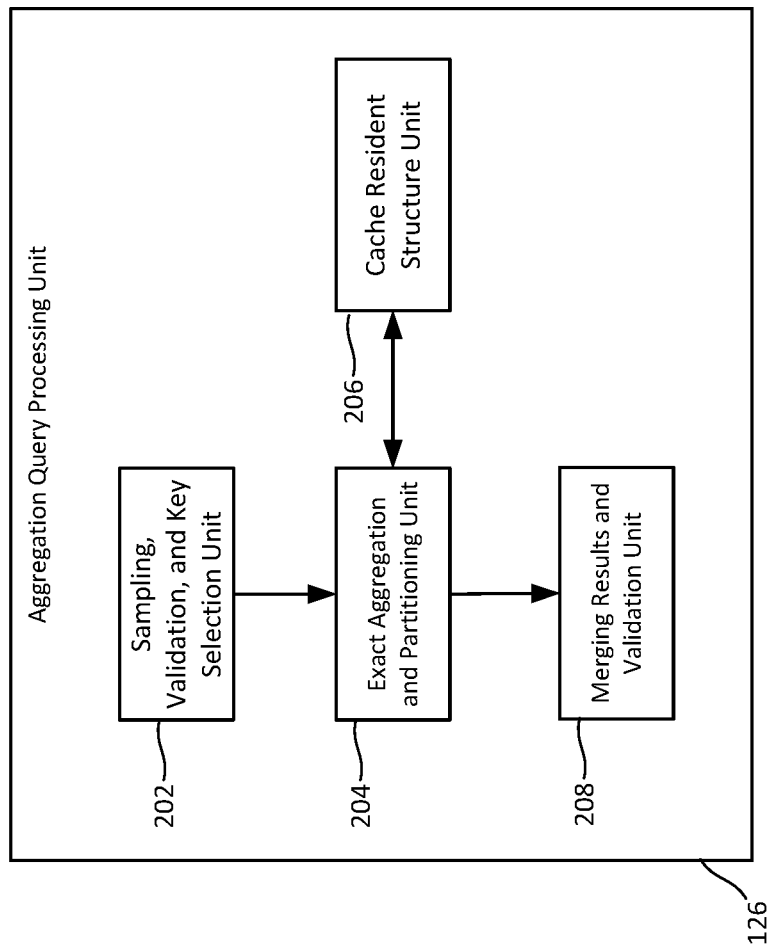
FIG. 2 is a diagram showing additional features of the aggregation query processing unit of the application services platform shown in FIG. 1.

FIG. 2 shows an example implementation of the aggregation query processing unit 126. The aggregation query processing unit 126 implements the framework for efficiently executing top-k aggregation queries over high cardinality large datasets. The framework implements cache-optimized data structures and an adaptive multi-pass workflow that utilizes the cache-optimized data structures. The aggregation query processing unit 125 includes a sampling, validation, and key selection (SVKS) unit 202, an exact aggregation and partitioning unit 204, a cache resident structure unit 206, and a merging results and validation unit 208. The SVKS unit 202 implements the first stage of the adaptive multi-pass workflow, the exact aggregation and partitioning unit 204 implements the second stage of the adaptive multi-pass workflow, and the merging results and validation unit 208 implements the third stage of the adaptive multi-pass workflow. The cache resident structure unit 206 implements the cache-optimized data structures.

The cache-conscious aggregation framework implemented by the aggregation query processing unit 126 is designed for high parallelizability, with both the FA and CA following a shared-nothing approach. In particular, the first stage involves sampling and performing local aggregation for each grouping key independently and in parallel. The sampling operation is followed by the synchronization step, where the distribution is validated, and the FA groups are identified. In subsequent passes, each core operates independently, computing exact aggregates for the FA groups and constructing logical or physical partitions for the CA. After each pass, the exact aggregates and statistics are merged across cores, and partitions that can be pruned are identified. The intermediate synchronization step is parallelizable itself and only consumes a small fraction of the total processing time. The pruning of partitions reduces the need for physical partitioning and decreases processing time for each core in subsequent passes.

When the number input or intermediate partitions exceeds the number of worker threads, the unpruned partitions are ranked using estimated aggregated values for each grouping key within a partition. This ranking allows for determining the processing order using worker threads. Formally, if d represents the estimate number of distinct values of groups in a partition, and psum, pcount, pmin, and pmax represent partition-level statistics, the estimated values for sum and average of a grouping key are psum/d and psum/count, respectively. The estimated values for max and min are set to the same values as the pmax and pmin.

The SVKS unit 202 implements the first stage of the adaptive multi-pass workflow, which includes a representative sampling operation, a skew validation operation, and a key selection operation. The SVKS unit 202 performs representative sampling on the dataset that uses a uniform random sample of the input dataset. However, uniform random sampling alone may not capture rare groups that include very few tuples in input datasets that have skewed distributions with a long tail. To address this issue, the SVKS unit 202 adopts a sampling strategy that aims to capture groups within minimum proportion, referred to herein as a tolerance level and denoted by $\Delta$. Groups with proportions below $\Delta$ are deemed to be less likely to be candidate groups and are disregarded during the representative sampling analysis. Later stages of the adaptive multi-pass workflow capture any candidate groups with proportions below $\Delta$ that were inadvertently disregarded.

To ensure that the samples are representative of the input dataset, the samples are collected such that the relative proportion of tuples for different groups reflects the input dataset. The sample size k is independent of the dataset size. The representative sample size can be represented as follows:

For a given tolerance level $\Delta \in [0,1]$ and the confidence interval level $1-\alpha$, where a sample size s satisfies $$P(|r_i - r'_i| < \Delta, 1 \leq i \leq k) > 1 - \alpha \text{ is } \geq \frac{z_{\alpha/2}^2}{4\Delta^2}.$$

The number of tuples for the $i^{th}$ grouping key in a dataset of size N is denoted as $n_i$. The population ratio of the $i^{th}$ group is denoted as $$r_i = \frac{n_i}{N}.$$

For a sampled dataset of size s, the number of tuples for the $i^{th}$ grouping key is denoted as $n'_i$. The population ratio in the sampled dataset is denoted as $$r'_i = \frac{n'_i}{s},$$

and the deviation in the population ratio is donated as $|r_i - r'_i|$. To determine the sample size s, an upper bound $s_u$ is determined that guarantees a tolerance level $\Delta$ and a confidence interval of $1-\alpha$. The upper bound $s_u$ ensures that the maximum ratio deviation is within the tolerance level $\Delta$ for all I, given that $s > s_u$. Essentially, when the sample size exceeds the threshold $s_u$, the distribution of the population ratio in the sampled dataset is representative of the input dataset for groups with a proportion greater than $\Delta$.

Once the representative sample size has been determined, the SVKS unit 202 randomly samples tuples from the input dataset. The samples are then further analyzed to determine the skewedness of the dataset. Skewed data exhibits an uneven distribution, while non-skewed data exhibits an even distribution. For datasets with non-skewed distribution or queries with large values of k, the scope for top-k optimization is limited. If the SVKS unit 202 determines that the top-k optimization is possible, the SVKS unit 202 identifies candidate groups for the fine-grained aggregates (FA) as discussed in greater detail below.

To validate the skewedness of the dataset, the SVKS unit 202 estimates a confidence interval for each group in the sample. Using the minimum value (a), the maximum value (b), and the number of tuples for that grouping key in the samples ($n'_i$), the SVKS unit 202 applies Hoeffding's inequality to calculate the confidence interval (CI) with a confidence level of $\beta$. The CI is given by:

$$\epsilon = (b-a)\frac{1}{2n'_i}\left(\ln\frac{2}{1-\beta}\right)^{1/2}$$

The SVKS unit 202 then considers $L_k$, the $k^{th}$ highest lower bound on aggregate values among all groups in the samples, and Cs, the cache space occupied by grouping keys and their corresponding aggregate values for groups with estimated lower bounds greater than $L_k$. If $C_s > C_f$, the validation fails because the cache space occupied by the grouping keys exceeds the size of the cache space allocated to the FA ($C_f$ is the cache space allocated to the first cache resident data structure), and the SVKS unit 202 will indicate to the aggregation query processing unit 126 that the optimized multi-pass aggregation techniques provided herein cannot be utilized because the skew of the dataset is not significant enough to efficiently identify a small set of candidate groups using these techniques.

However, if $C_s \leq C_f$, the SVKS unit 202 includes at most h heavy hitters (with size $C_h$) in the FA, such that the combined size of the selected groups based on the confidence intervals and heavy hitters is close to $C_f$ (i.e., $C_s + C_h \approx C_f$). By utilizing heavy hitters to fill the remaining space in the first cache resident data structure for storing the FA, the number of tuples per partition in the CA is reduced. A technical benefit of this approach is that it improves the pruning process and minimizes the need for physical partitioning.

The exact aggregation and partitioning unit 204 implements the second stage of the adaptive multi-pass workflow. In this stage, the exact aggregation and partitioning unit 204 the multi-pass aggregation is performed on input dataset now that the FA and CA have been identified. The exact aggregation and partitioning unit 204 determines whether, for a given partition, whether the exact aggregates can be computed with minimal cache-line transfers. If the number of cache-line transfers would be less than a threshold value, then the exact aggregation and partitioning unit 204 performs exact aggregation for the whole partition. What this means is that the entire local cache of the core of the multicore processor is allocated to the FA. This occurs when there is sufficient locality in the occurrences of the groups, or there are few distinct values in the partition. However, if the exact aggregation cannot be performed for the whole partition, then the cache resident structure unit 206 allocates two cache resident data structures as discussed below. For all candidate groups, the exact aggregates are determined for the FA and partitions are created for the CA groups. Additional details of how the exact aggregates are determined for the FA and the partitions are created for the CA groups are described in detail below.

Figure 5:
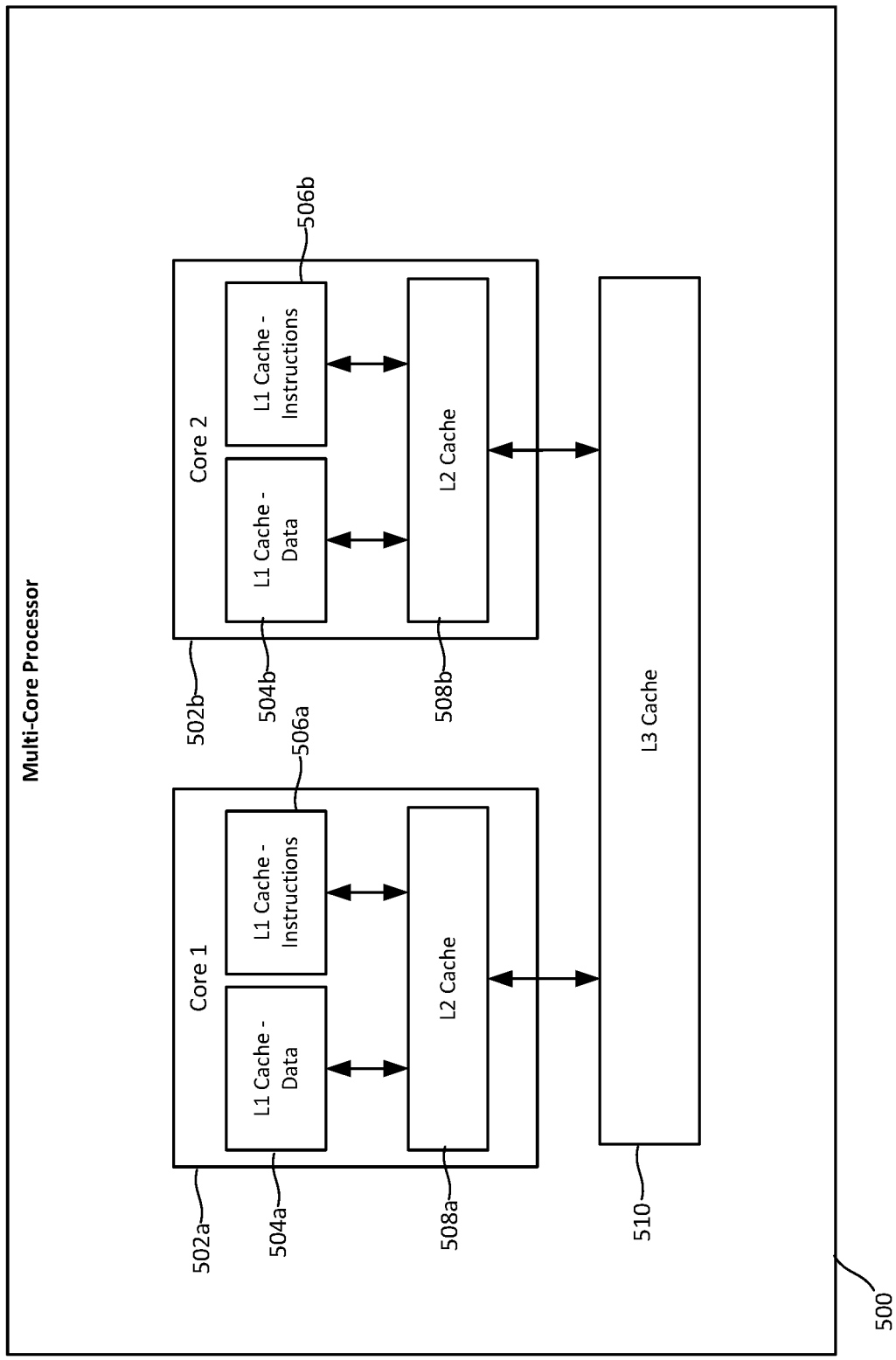
FIG. 5 is an example of an implementation of a multicore processor that can be used to implement the techniques provided herein.

The cache resident structure unit 206 allocates two cache resident data structures for the core of the multicore processor of the database system. The cache resident structure unit 206 allocates the cache resident data structures in response to a signal from the exact aggregation and partitioning unit 204 that the data structures are required for a particular core of the multicore processor. FIG. 5 shows an example implementation of a multicore processor 500 that includes two cores 502a and 502b. The core 502a includes an L1 cache that includes two parts: the L1 data cache 504a and the L1 instruction cache 506a. The core 502a also includes the L2 cache 508a and shares the L3 cache 510 with the other core 502b. The core 502b includes also an L1 cache that includes two parts: the L1 data cache 504b and the L1 instruction cache 506b. The core 502b includes the L2 cache 508b and shares the L3 cache 510 with the other core 502b. The cache resident structure unit 206 utilizes the L1 data cache 504a and L2 cache 508a to store the cache resident data structures for the core 502a. The cache resident structure unit 206 utilizes the L1 data cache 504b and L2 cache 508b to store the cache resident data structures for the core 502b. The example implementation shown in FIG. 5 includes two cores. However, other implementations can utilize implementations of the application services platform 110 may be implemented with a processor that includes a different number of cores.

The first cache resident data structure is the fine-grained aggregates (FA) data structure that uses optimized hash tables to store candidate groups likely to be in the top-k. The first cache resident data structure is used for computing the exact aggregates for candidate groups in a single pass of the data stored therein. The candidate groups are those groups which are likely, but not guaranteed, to be included in the top-k results. The SVKS unit 202, discussed below, selects the candidate groups. The first cache resident data structure utilizes a single-level hash table with linear probing with a sufficiently large size to minimize collisions. A technical benefit of using the single-level hash tables is that this approach improves performance by eliminating branching and chaining.

The second cache resident data structure is the coarse-grained aggregate (CA) data structure that is used for partitioning the data corresponding to the non-candidate groups. For each partition, the aggregation query processing unit 126 computes the small-space statistics (also referred to herein as "group-specific statistics") which may include but not limited to: sum, count, max, min, and approximate distinct count. The approximate distinct count is determined using the Flajolet Martin (FM) algorithm, which is used to approximate the number of unique elements in a partition in one pass.

The second cache resident data structure utilizes logical partitioning rather than physical partitioning. In logical partitioning, the statistics for the partition are maintained using the hash of the partition key without any physical movement of the tuples. In contrast, in a physical partition, the statistics are for the partition are computed but the input tuples are also moved to co-located memory locations using radix partitioning. The aggregation query processing unit 126 buffers one partition per cache line for each core and writes the partition data to the memory once full using non-temporal store instructions. A technical benefit of this approach is that the aggregation query processing unit 126 can create more logical partitions than physical partitions which minimizes cache-line transfers.

Analysis of the allocation of the memory space in the L1 and L2 caches of the core has shown that an equal-sized allocation of memory space to the first cache resident data structure and the second cache resident data structure. Therefore, where C represents the size of the cache of a given core, the size of the first cache resident data structure $C_f$ and the size second cache resident data structure $C_c$ are each C/2. In a non-limiting example referring to the multi-core processor shown in FIG. 5, the value of C for the core 502a equals the size of the L1 data cache 504a and the L2 cache 508a.

The exact aggregation and partitioning unit 204 applies exact aggregation in two scenarios: (1) the number of distinct groups can fit within the local cache, or (2) there is a high level of locality among the groups within a partition. To measure locality, the exact aggregation and partitioning unit 204 considers a smaller set of contiguous tuples within the partition, referred to herein as a "segment," and measure the number of distinct elements per segment. The variable $c_s$ represents the cardinality of the segment s, and $d_s$ denotes the number of distinct groups for the segment s. The exact aggregation and partitioning unit 204 calculates the locality of groups, denoted by l, as follows:

$$l = \frac{\sum_s \frac{d_s}{c_s}}{t}$$

where t is the number of segments in the partition. If $l < \alpha_0$, a predetermined constant, the exact aggregation and partitioning unit 204 determines that there is sufficient locality to perform exact aggregation efficiently for the partition. The values of s and $\alpha_0$ are tuned once for a specific machine and are determined through benchmarking using synthetic datasets. In one example implementation, the benchmarking determined that s=100 k and $\alpha_0$=0.20 yielded optimal results.

The exact aggregation and partitioning unit 204 can utilize either logical or physical partitioning. The exact aggregation and partitioning unit 204 opts for partitioning if the estimated number of distinct groups in a partition is significant and there is insufficient locality. Logical partitioning is preferred when partition-level statistics can be used to prune many child partitions. However, if it unlikely that the top-k groups can be identified using FA, logical partitioning may not result in significant pruning. In such cases, physical partitioning can be more useful as it allows for early aggregation of groups with skewed frequencies, leading to improved bounds in subsequent passes. For physical partitions, the exact aggregation and partitioning unit 204 creates as many buffers as the number of cache lines and moves the partitions to main memory once full following a software-managed buffer strategy.

The exact aggregation and partitioning unit 204 makes the decision whether to utilize logical versus physical partitioning based on the cardinality of partitions. A partition with more tuples is more likely to contain a grouping key in the final results compared to those partitions with fewer tuples. Moreover, a partition with fewer tuples is expected to have looser bounds than partitions with fewer tuples and hence less likely to be pruned. Let Z be the maximum number of logical partitions that CA can hold, and $T_c$ be the lowest frequency of any group among the current candidate groups. If C is the cardinality of the input partition, the average number of elements per logical partition is estimated as C/Z (assuming a conservative scenario of uniform distribution). The exact aggregation and partitioning unit 204 opts for logical partitioning where $C/Z < T_c$. Otherwise, the exact aggregation and partitioning unit 204 performs physical partitioning, anticipating that one of the child partitions may contain a grouping key that will be present in the final result. If the exact aggregation and partitioning unit 204 selects a logical partitioning and not all child logical partitions are pruned after the pass, the exact aggregation and partitioning unit 204 performs physical partitioning on the unpruned partitions during the next pass, followed by the analysis to determine whether to user aggregation or partitioning as discussed above.

The merging results and validation unit 208 implements the third stage of the adaptive multi-pass workflow in which intermediate results are merged across cores and the top-k results are validated. After each pass on the data, the merging results and validation unit 208 performs merging of partial aggregates of FA groups and statistics for partitions across all cores. After this merging, the exact aggregates for the FA groups are known. The merging results and validation unit 208 uses the partition-statistics to establish upper bounds on the aggregate values for non-candidate groups. In particular, the partition level sum provides an upper bound for sum and average aggregates, while the maximum value sets an upper bound for max and min aggregates. Based on the exact aggregates and bounds, the merging results and validation unit 208 unit computes the threshold $T_k$ (also referred to herein as the "pruning threshold") on the smallest possible value of the $k^{th}$ aggregate for pruning partitions. The merging results and validation unit 208 eliminates any partitions with upper bounds on aggregate values that are less than $T_k$ from further processing during subsequent passes. The simple partition-level statistics while taking less space can effectively prune partitions in scenarios where skewed distributions features a long tail of groups with significantly smaller values. Moreover, segregating FA groups helps reduce the number of tuples sent to partitions in CA, leading to improved pruning. While more sophisticated sketches could provide better bounds, the associated space and computation overhead to employ such sketches can often be substantial.

The aggregation query processing unit 126 supports "rolling top-k" in some implementations. In the rolling top-k scenario, the top-k aggregate query is issued repeatedly with an increasing window of k values. To avoid running the algorithm from scratch each time that more results are requested, the following changes are introduced to the adaptive multi-pass workflow.

During the first iteration of the adaptive multi-pass workflow, samples are collected to validate the applicability of the top-k optimization and to identify the FA groups as discussed in the preceding examples. The confidence intervals are computed for each grouping key in the sample as discussed in the preceding examples. Both the sample size and confidence intervals are independent of the value of k as hence can be reused during subsequent iterations. Only skew validation and identification of new FA groups are performed for increasing k values. If the number of FA groups exceeds the FA cache size limit in any iteration, the aggregation query processing unit 126 resorts to using the standard approach of computing exact aggregates for all groups in the dataset.

The aggregation query processing unit 126 augments the exact augmentation and partitioning process to reuse computations across queries. Intermediate results, including exact aggregates and partition statistics are independent of the value of k and are stored in main memory allowing for their reuse. During the processing of subsequent queries, the aggregation query processing unit 126 performs lookups using partition has to determine if the intermediate results have already been computed during previous query processing. If so, the aggregation query processing unit 126 reuses these values whenever possible. The third stage of the adaptive multi-pass workflow in which intermediate results are merged and the top-k is validated remains unchanged.

Figure 3B:
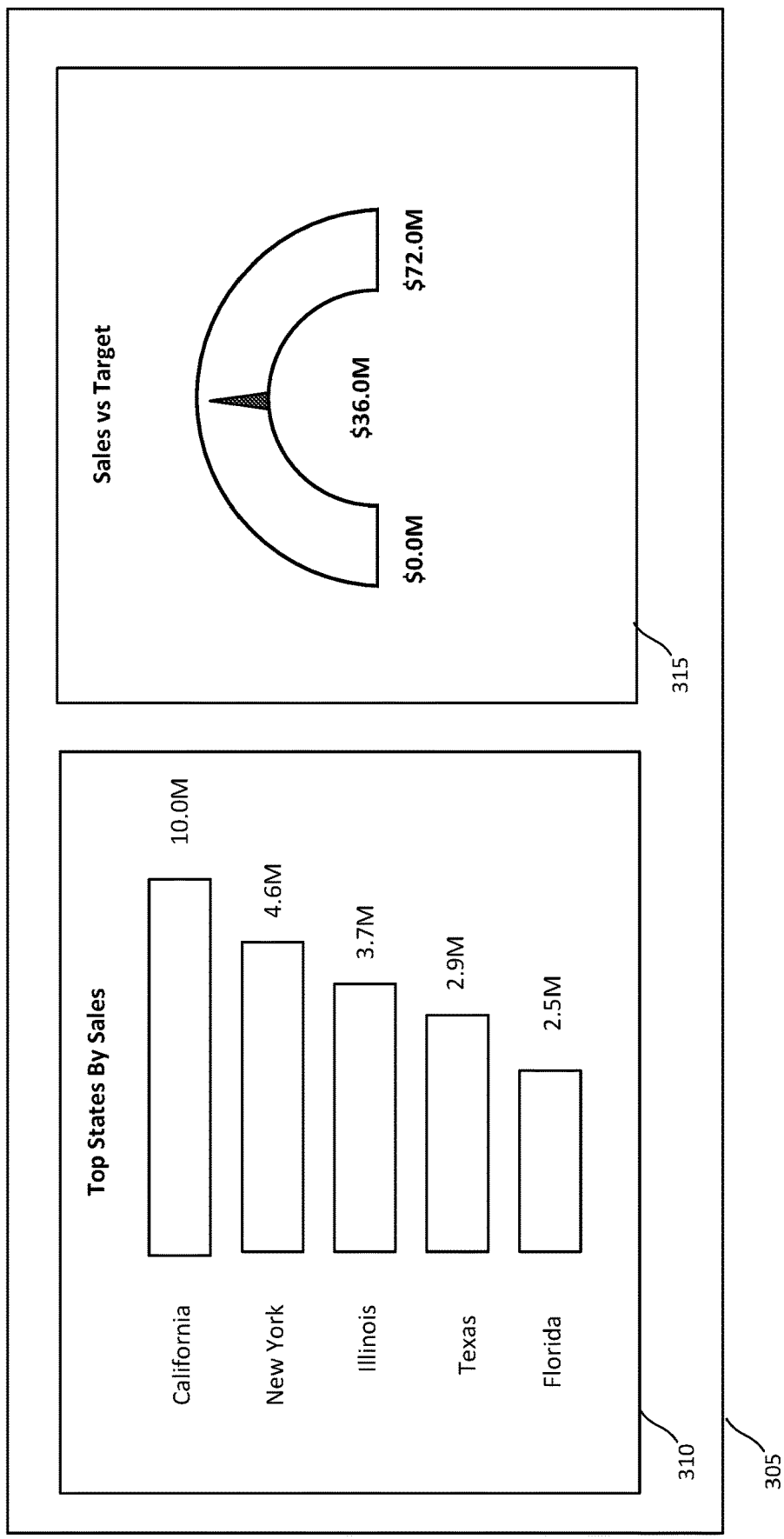
FIG. 3B is a diagram of a user interface of a business intelligence application showing example results of executing the example query shown in FIG. 3A.

FIG. 3A is a diagram showing an example of a typical top-k aggregation query that may be used with the techniques provided herein. The query shown in FIG. 3A selects a dimension attribute X and a measure attribute Y from a database table R, and the number of results is limited to k results. The value A represents the aggregate value of the attribute Y for the group X. The query shown in FIG. 3A is merely an example of one aggregate top-k query that might be analyzed using the techniques provided herein. The results of such top-k aggregation queries can be visualized as a bar chart, as shown in the example dashboard for a business intelligence tool shown in FIG. 3B. The value of the aggregate function AGG(Y) is depicted on the y-axis and the distinct values of X are depicted on the x-axis. Furthermore, the examples discussed herein are primarily focused on monotonic aggregation functions, such as but not limited to COUNT(Y), MAX(Y), MIN(Y), and SUM(Y) where $Y \geq 0$ and the aggregate value for a given group either increases or decreases as the tuples belonging to the group are aggregated. However, these techniques can also benefit non-monotonic functions, such as but not limited to AVG(Y), by bounding these functions using monotonic functions, particularly for skewed distributions. Moreover, while the examples discussed herein focus on aggregation queries with a single GROUP BY attribute, these techniques can be extended to support multiple GROUP By attributes, aggregation over expressions of multiple attributes, selected predicates, as well as primary key-foreign key (PK-FK) joins.

FIG. 3B is a diagram of a user interface 305 that is an example dashboard of a business intelligence application showing example results of executing the example query shown in FIG. 3A. The user interface 305 may be implemented by the native application 114 or the web application 190 of the application services platform 110 shown in FIG. 1 and discussed in detail in the examples which follow. The dashboard in this example includes two widgets 310 and 315 that provide visualizations of sales data. Other implementations may include other types of widgets for analyzing and visualizing other types of data in addition to and/or instead of one or more of the widgets shown in this example implementation. The widget 310 presents a visualization of the states that had the top sales for the organization. In this example, the query shown in FIG. 3A may be utilized to generate the data for this visualization. As such, the value of X represents the state, the value of Y represents sales data. The values of X and Y are obtained from the sales table R. The value of k in this example is 5, because the widget 310 presents the top five sales by state. Each state may be associated with multiple sales representing multiple rows in the table R, and the aggregation function aggregates these sales values associated with each state. The top five results are then rendered by the native application 114 or the web application 190. The native application 114 and/or the web application 190 can provide a user interface that enables users to edit queries utilized by the widgets on the user interface 305, to add additional widgets to the user interface 305, and/or remove widgets from the user interface 305.

In contrast with the multi-pass aggregation approach shown in FIG. 4A, FIG. 4B is a diagram showing an example of aggregation according to the cache-conscious aggregation framework described herein. The initial dataset 402 is analyzed using the techniques implemented by the aggregation query processing unit 126 and discussed in the preceding examples. The initial dataset 402 is sampled and the samples are analyzed to identify the fine-grained aggregates (FA) and the coarse-grained aggregates (CA). In the example shown in FIG. 4B, the initial dataset 402 is samples and the samples are analyzed to determine whether the dataset 402 is sufficiently skewed for the adaptive multi-pass strategy implemented by the cache-conscious aggregation framework operate efficiently. The FA and the CA are stored in the cache resident data structures discussed above. The FA are stored in the first cache resident data structure and the CA are stored in the second cache resident data structure. Exact aggregates are determined for the FA 404 and 408. The black filled boxes depict exactly aggregated tuples. The CA 406 and 410 are further analyzed and partitioned. The grey pattern filled boxes are partitions that have been pruned according to the techniques described herein.

Figure 6:
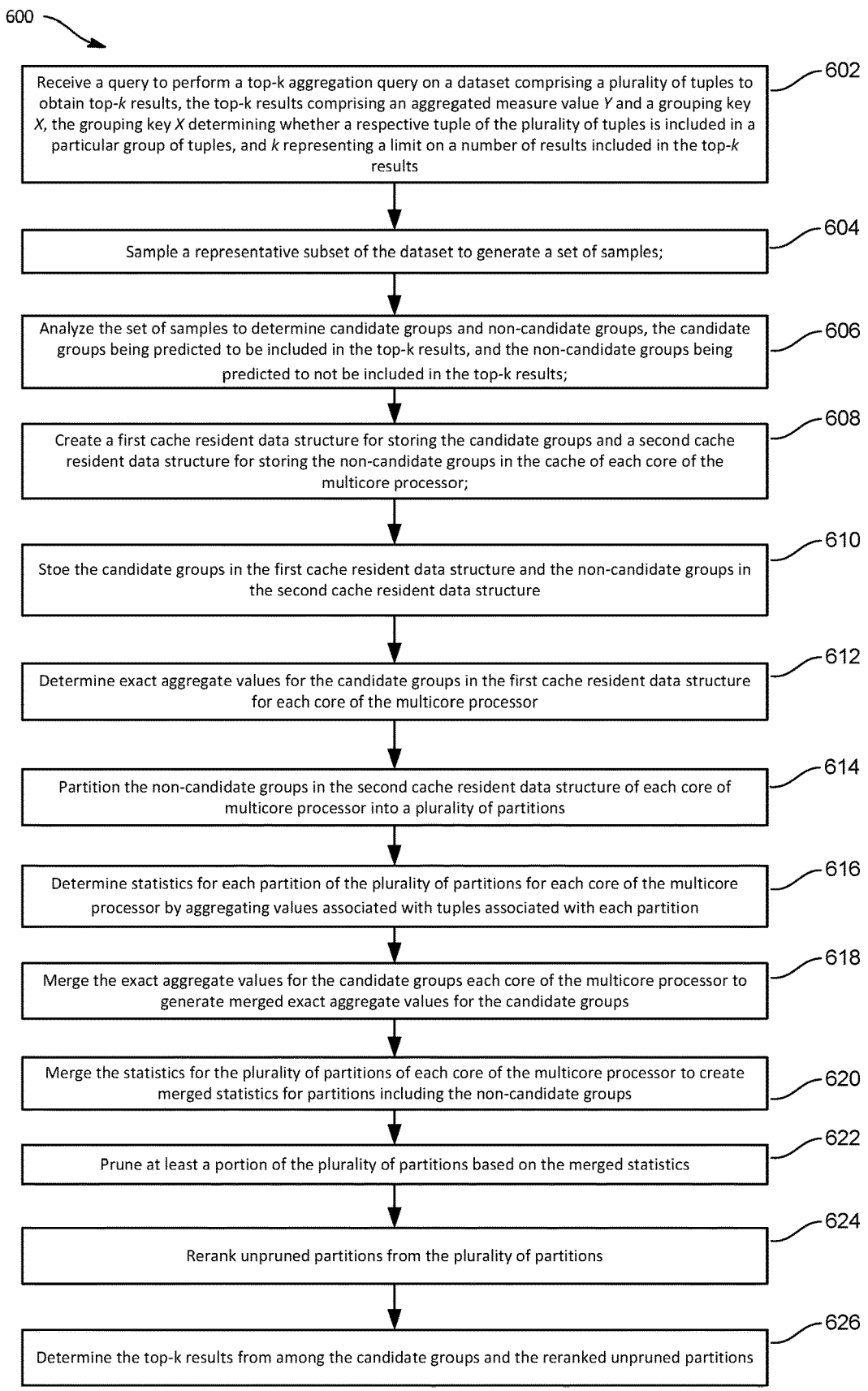
FIG. 6 is a flow chart of an example process for cache-efficient top-k aggregation over high cardinality large datasets according to the techniques disclosed herein.

FIG. 6 is a flow chart of an example process 600 for cache-efficient top-k aggregation over high cardinality large datasets according to the techniques disclosed herein. The process 600 can be implemented by the aggregation query processing unit 126 of the application services platform 110 as discussed in the preceding examples.

The process 600 includes an operation 602 of receiving a query to perform a top-k aggregation query on a dataset comprising a plurality of tuples to obtain top-k results, the top-k results comprising an aggregated measure value Y and a grouping key X, the grouping key X determining whether a respective tuple of the plurality of tuples is included in a particular group of tuples, and k representing a limit on a number of results included in the top-k results. An example of such a query is shown in FIG. 3A. The query can be received from a business intelligence application, such as the native application 114 or the web application 190.

The process 600 includes an operation 604 of sampling a representative subset of the dataset to generate a set of samples. A large dataset may include may hundreds of thousands or many millions of tuples of data. The aggregation query processing unit 126 utilizes sampling to determine whether the dataset is sufficiently skewed for the cache-efficient top-k aggregation and to identify candidate groups. A technical benefit of this approach is that the exact aggregates are not calculated for all groups in the dataset, which significantly reduces the computing resources required to determine the top-k results compared to the standard approach in which the exact aggregates are determined for all of the groups in the dataset.

The process 600 includes an operation 606 of analyzing the set of samples to determine candidate groups and non-candidate groups, the candidate groups being predicted to be included in the top-k results, and the non-candidate groups being predicted to not be included in the top-k results. As discussed in the preceding examples, the exact aggregates can be determined for the candidate groups that are more likely to include the top-k results, while the non-candidate groups are subject to further analysis in which the non-candidate groups are partitioned and pruned.

The process 600 includes an operation 608 of creating a first cache resident data structure for storing the candidate groups and a second cache resident data structure for storing the non-candidate groups in the cache of each core of the multicore processor and an operation 610 of storing the candidate groups in the first cache resident data structure and the non-candidate groups in the second cache resident data structure. The cache resident data structures are created in the cache of each of the cores of the multicore processor as discussed in the preceding examples. These data structures facilitate the cache-efficient top-k aggregation techniques herein by storing all or as much of the data used by the cache-conscious aggregation framework in the cache so that the cores of the multicore processor can quickly access and analyze the data while minimizing costly cache-line transfers.

The process 600 includes an operation 612 of determining exact aggregate values for the candidate groups in the first cache resident data structure for each core of the multicore processor. The exact aggregate values for the candidate groups are determined using the single-level hash table with linear probing discussed in the preceding examples. The cost in processing resources associated with calculating the exact aggregates for the candidate groups is significantly less than the cost associated with calculating the exact aggregate values for all of the groups in the dataset (which is the standard approach for determining the aggregate values for the groups for a top-k query).

The process 600 includes an operation 614 of partitioning the non-candidate groups in the second cache resident data structure of each core of multicore processor into a plurality of partitions and an operation 616 of determining statistics for each partition of the plurality of partitions for each core of the multicore processor by aggregating values associated with tuples associated with each partition. As discussed in the preceding examples, the aggregation query processing unit 126 partitions the non-candidate groups using either logical or physical partitioning. Statistics for each of the partitions are determined by the aggregation query processing unit 126, and these statistics can later be used when pruning partitions that are not likely to include the top-k results.

The process 600 includes an operation 618 of merging the exact aggregate values for the candidate groups for the plurality of cores to generate merged exact aggregate values for the candidate groups and an operation 620 of merging the statistics for the plurality of partitions of each core of the multicore processor to create merged statistics for partitions including the non-candidate groups. The intermediate results determined by each of the cores are merged together so that the top-k results can be determined. While the exact aggregate values for the candidate groups have been determined, additional partitioning and pruning of the non-candidate groups may still be necessary in order to determine the top-k results.

The process 600 includes an operation 622 of pruning at least a portion of the plurality of partitions based on the merged statistics and an operation 624 of reranking unpruned partitions from the plurality of partitions. As discussed in the preceding examples, the merged statistics can be used to determine upper bounds for on the aggregate values for the non-candidate groups. Those groups in which the aggregate values fall below a predetermined threshold are eliminated, which decreases the computational resources required for the next pass through the remaining non-candidate groups.

The process 600 includes an operation 626 of determining the top-k results from among the candidate groups and the reranked unpruned partitions. The unpruned partitions are subject to additional partitioning and pruning until the partitions have been completely eliminated and/or candidate groups that belong to the top-k but were not initially discovered at the representative sampling stage are identified.

The detailed examples of systems, devices, and techniques described in connection with FIGS. 1-6 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
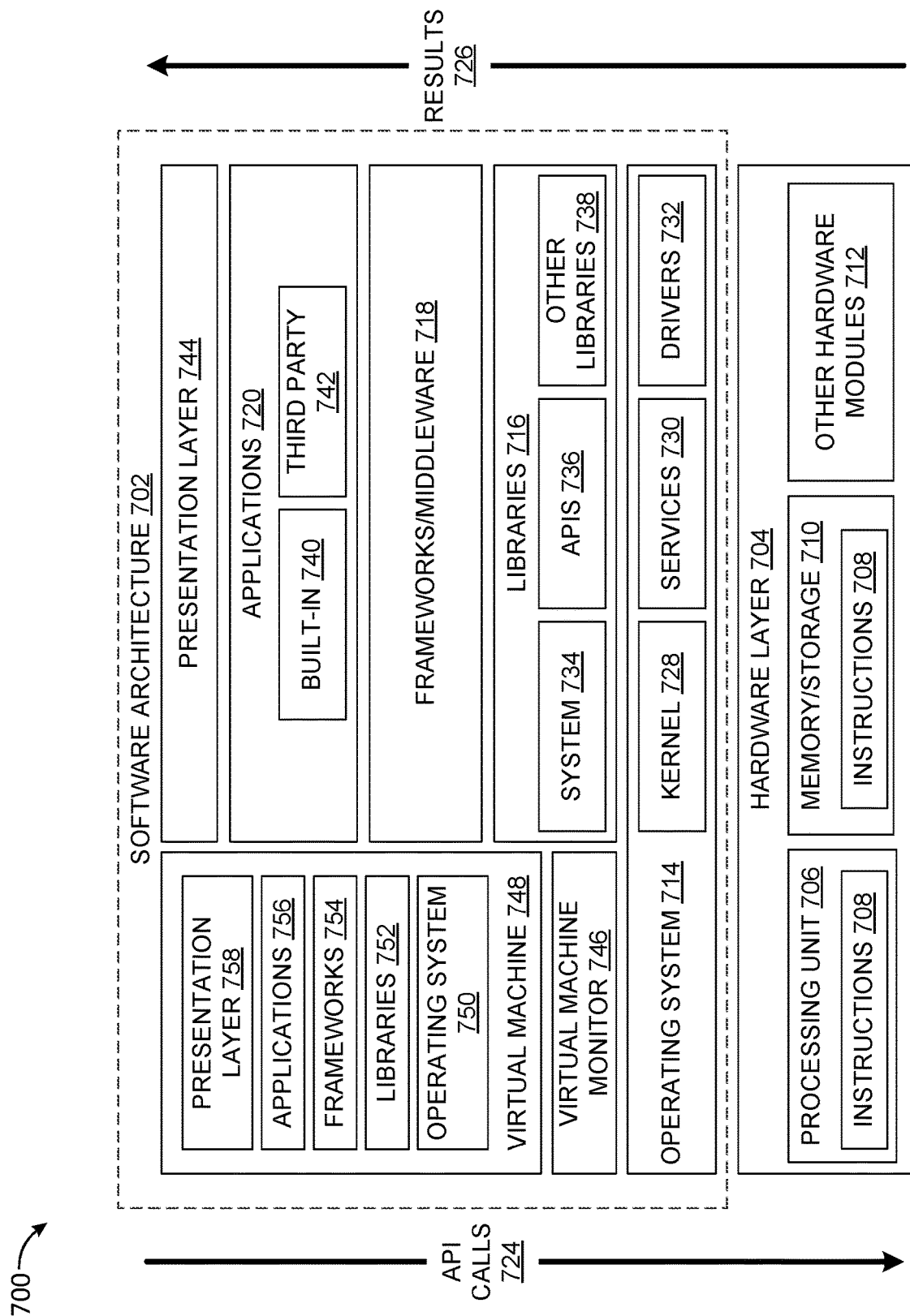
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
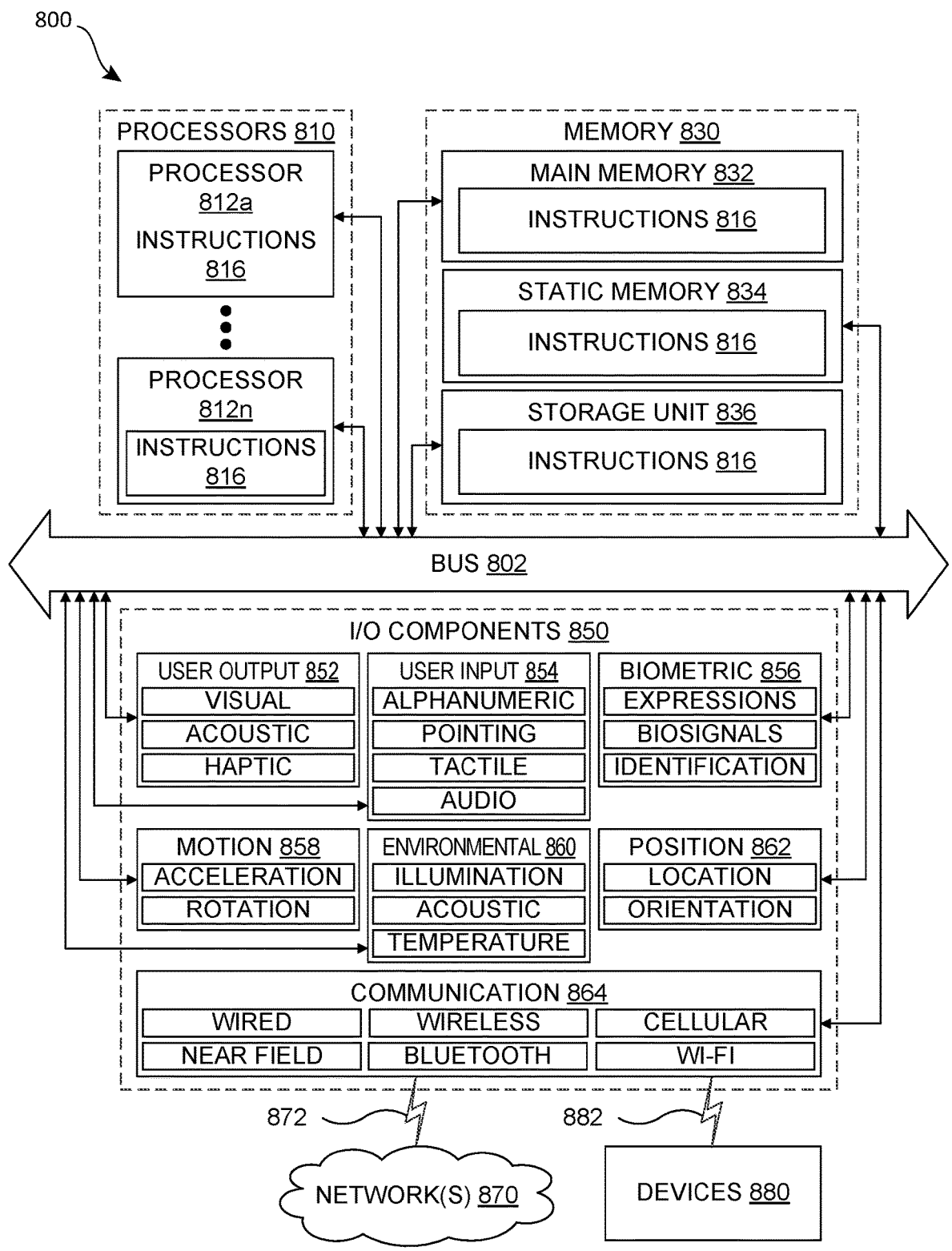
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multicore processor including cores that may execute instructions contemporaneously. Although FIG. 8 shows multiple processors, the machine 800 may include a single processor with a single core, a single processor with multiple cores (for example, a multicore processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a multicore processor; and
a machine-readable storage medium storing executable instructions that, when executed, cause the multicore processor alone or in combination with other processors to perform operations of:
receiving a query to perform a top-k aggregation query on a dataset comprising a plurality of tuples to obtain top-k results, the top-k results comprising an aggregated measure value Y and a grouping key X, the grouping key X determining whether a respective tuple of the plurality of tuples is included in a particular group of tuples, and k representing a limit on a number of results included in the top-k results;
sampling a representative subset of the dataset to generate a set of samples;
analyzing the set of samples to determine candidate groups and non-candidate groups, the candidate groups being predicted to be included in the top-k results, and the non-candidate groups being predicted to not be included in the top-k results;
creating a first cache resident data structure for storing the candidate groups and a second cache resident data structure for storing the non-candidate groups in a cache of each core of the multicore processor;
storing the candidate groups in the first cache resident data structure and the non-candidate groups in the second cache resident data structure;
determining exact aggregate values for the candidate groups in the first cache resident data structure for each core of the multicore processor;
partitioning the non-candidate groups in the second cache resident data structure of each core of multicore processor into a plurality of partitions;
determining statistics for each partition of the plurality of partitions for each core of the multicore processor by aggregating values associated with tuples associated with each partition;
merging the exact aggregate values for the candidate groups each core of the multicore processor to generate merged exact aggregate values for the candidate groups;
merging the statistics for the plurality of partitions of each core of the multicore processor to create merged statistics for partitions including the non-candidate groups;
pruning at least a portion of the plurality of partitions based on the merged statistics;
reranking unpruned partitions from the plurality of partitions to generate reranked unpruned partitions; and
determining the top-k results from among the candidate groups and the reranked unpruned partitions.

2. The data processing system of claim 1, wherein the machine-readable storage medium further includes instructions configured to cause the multicore processor alone or in combination with other processors to perform operations of:
analyzing the exact aggregate values computed over samples to determine a skew in distribution of the exact aggregate values in the dataset.

3. The data processing system of claim 1, wherein partitioning the non-candidate groups in the second cache resident data structure further comprises:
determining whether to utilize logical partitioning or physical partitioning based on a cardinality and distribution of values of an input partition.

4. The data processing system of claim 3, wherein determining whether to utilize logical partitioning or physical partitioning based on the cardinality and distribution of values of the input partition further comprises:
partitioning the non-candidate groups using logical partitioning responsive to the cardinality of the input partition divided by a number of logical partitions that the second cache resident data structure is capable of storing is less than a lowest frequency of any group among a set of current candidate groups.

5. The data processing system of claim 1, wherein the first cache resident data structure is a single-level hash table with linear probing.

6. The data processing system of claim 1, wherein sampling the representative subset of the dataset to generate the set of samples further comprises:
randomly sampling tuples from groups having at least a number of tuples that satisfy a sampling tolerance level.

7. The data processing system of claim 1, wherein analyzing the set of samples to determine the candidate groups and the non-candidate groups comprises:
estimating a $k^{th}$ highest lower bound on aggregate values among all groups including the set of samples; and
selecting candidate groups from the set of samples having an estimated lower bound that exceed the $k^{th}$ highest lower bound.

8. The data processing system of claim 1, wherein determining statistics for each partition of the plurality of partitions further comprises:
determining group-specific statistics for each group within each partition; and
aggregating the group-specific statistics for all groups within each partition to determine the statistics for each partition.

9. The data processing system of claim 1, wherein pruning at least a portion of the plurality of partitions based on the merged statistics further comprises:
determining that upper bounds on aggregate values in the statistics associated with each partition of the at least the portion of the plurality of partitions are less than a pruning threshold.

10. The data processing system of claim 1, wherein the machine-readable storage medium further includes instructions configured to cause the multicore processor alone or in combination with other processors to perform operations of:
creating a visualization of the top-k results; and
causing a client device to present the visualization of the top-k results on a dashboard of a first application.

11. A method implemented in a data processing system for cache-efficient top-k aggregation, the method comprising:
receiving a query to perform a top-k aggregation query on a dataset comprising a plurality of tuples to obtain top-k results, the top-k results comprising an aggregated measure value Y and a grouping key X, the grouping key X determining whether a respective tuple of the plurality of tuples is included in a particular group of tuples, and k representing a limit on a number of results included in the top-k results;
sampling a representative subset of the dataset to generate a set of samples;
analyzing the set of samples to determine candidate groups and non-candidate groups, the candidate groups being predicted to be included in the top-k results, and the non-candidate groups being predicted to not be included in the top-k results;
creating a first cache resident data structure for storing the candidate groups and a second cache resident data structure for storing the non-candidate groups in a cache of each core of a multicore processor;
storing the candidate groups in the first cache resident data structure and the non-candidate groups in the second cache resident data structure;
determining exact aggregate values for the candidate groups in the first cache resident data structure for each core of the multicore processor;
partitioning the non-candidate groups in the second cache resident data structure of each core of multicore processor into a plurality of partitions;
determining statistics for each partition of the plurality of partitions for each core of the multicore processor by aggregating values associated with tuples associated with each partition;
merging the exact aggregate values for the candidate groups each core of the multicore processor to generate merged exact aggregate values for the candidate groups;
merging the statistics for the plurality of partitions of each core of the multicore processor to create merged statistics for partitions including the non-candidate groups;
pruning at least a portion of the plurality of partitions based on the merged statistics;
reranking unpruned partitions from the plurality of partitions to generate reranked unpruned partitions; and
determining the top-k results from among the candidate groups and the reranked unpruned partitions.

12. The method of claim 11, further comprising:
analyzing the exact aggregate values computed over samples to determine a skew in distribution of the exact aggregate values in the dataset.

13. The method of claim 11, wherein partitioning the non-candidate groups in the second cache resident data structure further comprises:
determining whether to utilize logical partitioning or physical partitioning based on a cardinality and distribution of values of an input partition.

14. The method of claim 13, wherein determining whether to utilize logical partitioning or physical partitioning based on the cardinality and distribution of the values of the input partition further comprises:
partitioning the non-candidate groups using logical partitioning responsive to the cardinality of the input partition divided by a number of logical partitions that the second cache resident data structure is capable of storing is less than a lowest frequency of any group among a set of current candidate groups.

15. The data processing system of claim 11, wherein the first cache resident data structure is a single-level hash table with linear probing.

16. The data processing system of claim 11, wherein sampling the representative subset of the dataset to generate the set of samples further comprises:
randomly sampling tuples from groups having at least a number of tuples that satisfy a sampling tolerance level.

17. The method of claim 11, further comprising:
estimating a $k^{th}$ highest lower bound on aggregate values among all groups including the set of samples; and
selecting candidate groups from the set of samples having an estimated lower bound that exceed the $k^{th}$ highest lower bound.

18. The method of claim 11, wherein determining statistics for each partition of the plurality of partitions further comprises:
determining group-specific statistics for each group within each partition; and
aggregating the group-specific statistics for all groups within each partition to determine the statistics for each partition.

19. The method of claim 11, wherein pruning at least a portion of the plurality of partitions based on the merged statistics further comprises:
  determining that upper bounds on aggregate values in the statistics associated with each partition of the at least the portion of the plurality of partitions are less than a pruning threshold.

20. The method of claim 11, further comprising:
creating a visualization of the top-k results; and
causing a client device to present the visualization of the top-k results on a dashboard of a first application.

* * * * *